June 15, 1965     D. L. EIDSON     3,189,700
VALVE ACTUATOR AND SWITCH
Filed Dec. 6, 1962     3 Sheets-Sheet 1
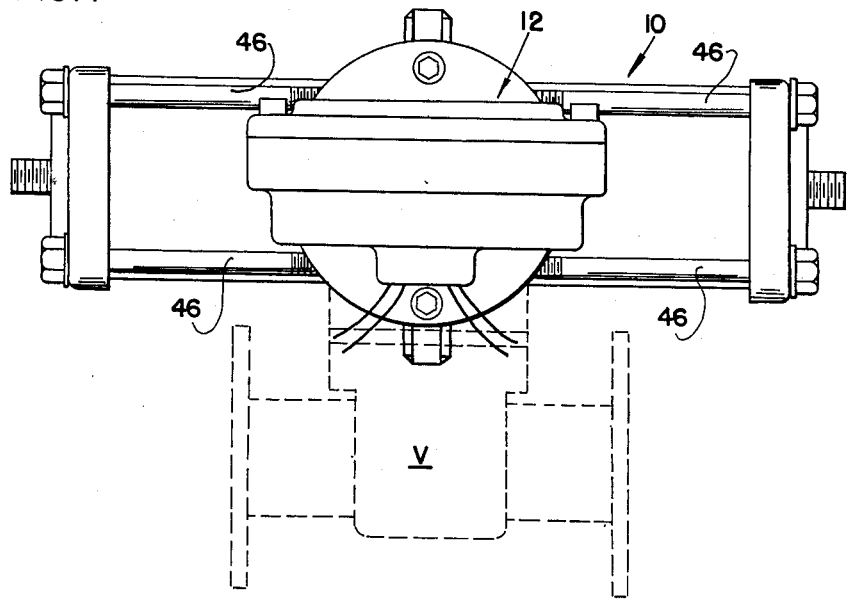
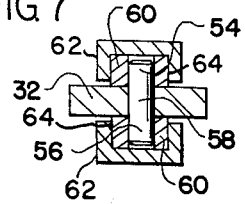
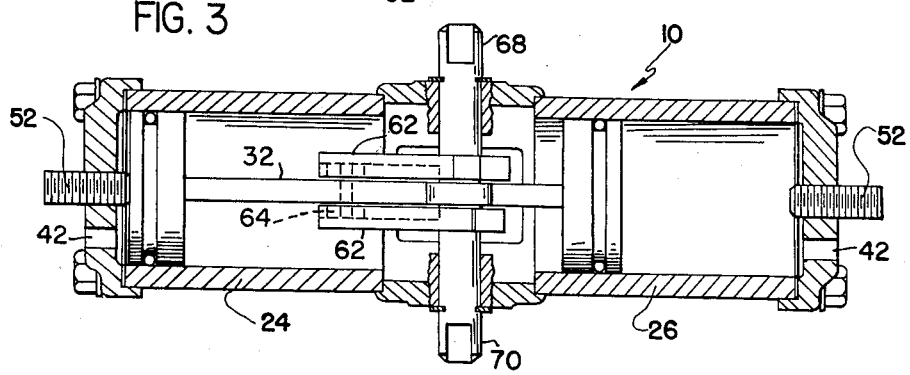
INVENTOR.
DENNIS L. EIDSON
BY Teller, McCormick, Paulding & Huber
ATTORNEYS June 15, 1965
D. L. EIDSON
3,189,700
VALVE ACTUATOR AND SWITCH
Filed Dec. 6, 1962
3 Sheets-Sheet 2
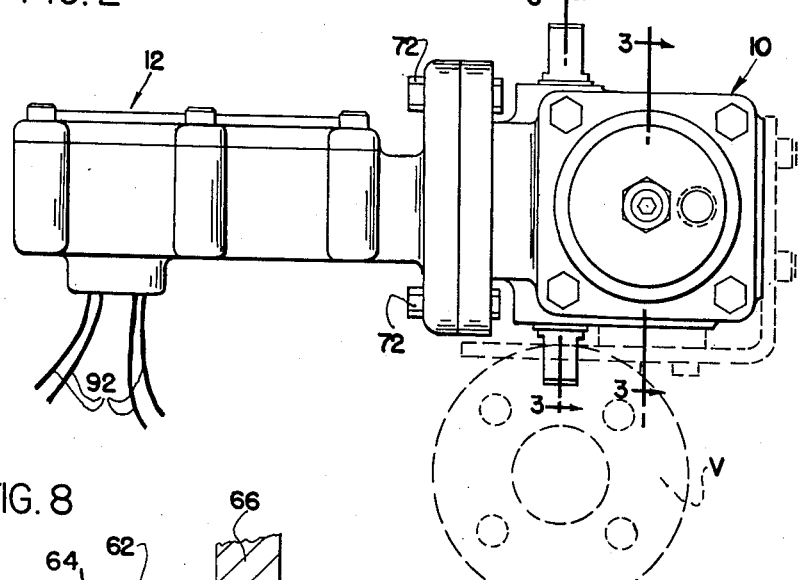
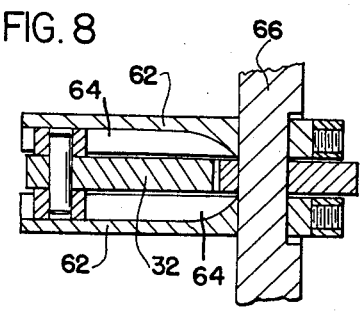
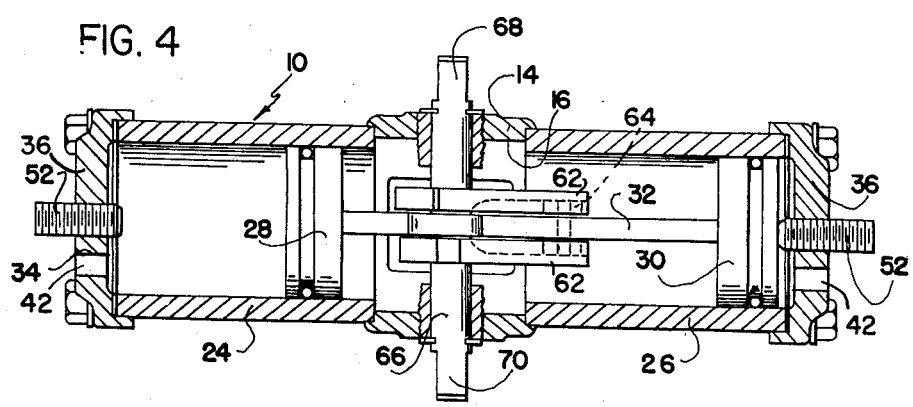

June 15, 1965

D. L. EIDSON 3,189,700

VALVE ACTUATOR AND SWITCH

Filed Dec. 6, 1962

3 Sheets-Sheet 3

United States Patent Office 3,189,700
Patented June 15, 1965

3,189,700
VALVE ACTUATOR AND SWITCH
Dennis L. Eidson, Windsor, Conn., assignor to Contromatics Corporation, Rockville, Conn., a corporation of Connecticut
Filed Dec. 6, 1962, Ser. No. 242,789
5 Claims. (Cl. 200—61.86)

This invention relates to a valve actuator and more particularly to improvements in a pneumatic valve actuator for use with valves of a type which are opened and closed by rotative movement.

It is the general object of the invention to provide a valve actuator of the aforementioned type which functions with a high degree of efficiency, is durable and dependable in use, and is of simple construction. A more specific object is to provide a valve actuator of the type described which is adapted to open and close an engaged, associated valve member as required by reciprocable movement of a double acting piston or the like, and which includes means for controlling remote signal devices that will indicate the "full-open" and "full-closed" positions of the valve. A further object of the invention is to provide a valve actuator of the type mentioned which is also adapted to regulate the operation of associated auxiliary equipment in response to the reciprocal movement of said piston.

The drawings show a preferred embodiment of the invention and such embodiment will be described, but it will be understood that various changes and modifications may be made from the construction disclosed, and that the drawings and description are not to be construed as defining or limiting the scope of the invention, the claims forming a part of this specification being relied upon for that purpose.

In the drawings:

FIG. 1 is an elevational front view of a valve actuator embodying the present invention shown in operative position with respect to an engaged associated valve member outlined in broken lines;

FIG. 2 is a side elevational view thereof;

FIG. 3 is a multi-plane vertical sectional view taken as indicated generally by the lines 3—3 of FIG. 2 and showing the piston and lever means of the actuator in "full-open" position;

FIG. 4 is a view similar to FIG. 3 showing the piston and lever means in "full-closed" position;

FIG. 7 is a fragmentary vertical sectional view taken on line 7—7 of FIG. 5; and FIG. 8 is an enlarged fragmentary vertical sectional view taken as indicated by line 8—8 of FIG. 5, showing in detail the connection of the lever arms with the piston rod of the actuator.

As shown in the drawings:

Figure 5:
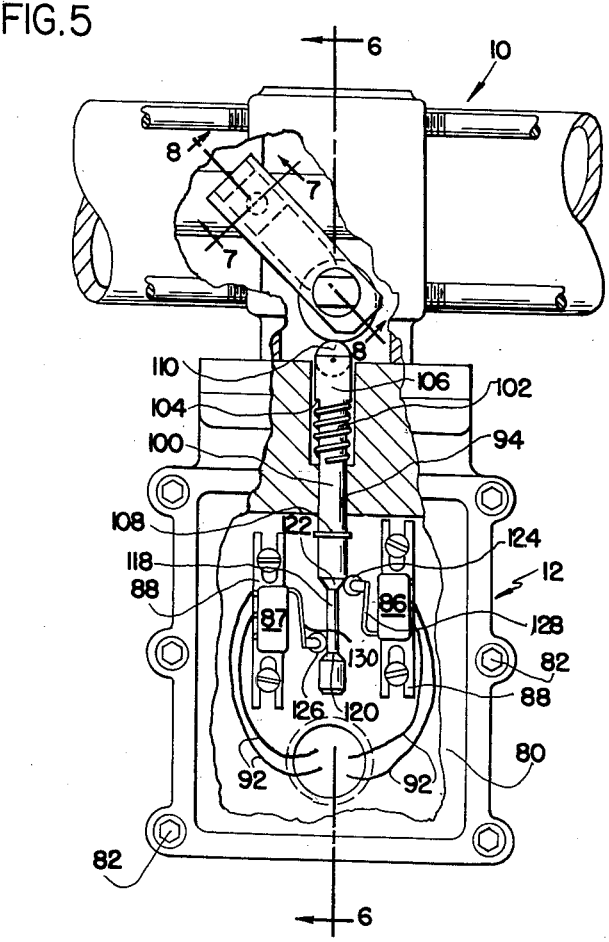
FIG. 5 is a plan view of the actuator of the present invention with parts broken away to show some details of the cylinder assembly and switch assembly thereof.

The preferred embodiment of the valve actuator constructed in accordance with the present invention comprises an actuator assembly indicated generally by the numeral 10 and a switch assembly indicated generally by the numeral 12.

The actuator assembly includes a housing 14 formed with a bore 16 extending longitudinally therethrough as best shown in FIGS. 3 and 4 of the drawing. The said housing is provided with a flange 18 on the inner face thereof formed with an opening 20 extending therethrough transversely to the longitudinal axis of the bore 16 and communicating therewith.

Opposed horizontal cylinders 24 and 26 respectively extend outwardly from either side of said housing 14 coaxially with said bore, forming extensions thereof. The cylinders are each adapted to receive pistons 28 and 30 respectively for reciprocable axial sliding movement therein. A rod 32 is secured at its ends to the respective pistons as shown in FIGS. 3 and 4. End caps 34 and 36 close the outer ends of the cylinders 24 and 26 respectively, being secured to the housing so as to support the cylinders as by elongated bolts 45, 46. The end caps are each provided with a suitable port 42 for selectively admitting and exhausting air or other fluid under pressure into and from the cylinders to effect reciprocation of the pistons and their connected rod. Adjustable set screws 52, 52, as shown, are provided to selectively adjust the stroke of the pistons 28 and 30 within the cylinders 24 and 26.

Projecting upper and lower ends 54 and 56, respectively, of a wrist pin 58 extending through the piston rod 32 at its midpoint and transverse to the longitudinal axis thereof are centrally received within spaced blocks 60, 60 as shown in FIGS. 7 and 8. The blocks 60, 60 are adapted for rotational movement about the wrist pin 58, and opposed, elongated lever arms, in the form of channel members 62, 62, are positioned substantially as shown in FIGS. 7 and 8 with their channels 64, 64 disposed to receive said blocks therebetween for longitudinal sliding movement therein. The arms 62, 62 are keyed to a vertical valve shaft 66 which is rotatably supported in the housing 14 at the side of the horizontal piston rod 32 and adjacent the flange opening 20 of the housing. The upper and lower terminal portions 68 and 70 respectively of the shaft 66 project outwardly of the housing 14 as illustrated and are each adapted for operative connection with an associated valve of a type, such as the valve V, which is opened and closed by rotative movement.

In operation when it is desired to open or close the valve V to which my improved valve actuator has been attached, compressed air or fluid under pressure is alternately introduced into, and exhausted from, the cylinders 24 or 26 by the port 42 causing the pistons 28 and 30 to reciprocate within the cylinders in a conventional manner. More particularly, if it is desired to move the connected valve V into a "full-open" position, compressed air or fluid is introduced into the cylinder 26 and exhausted from the cylinder 24 causing the pistons 28 and 30 to move within the cylinder from the position shown in FIG. 4 to that shown in FIG. 3. It is obvious that the axial travel of the piston rod 32 corresponds to the stroke of the pistons 28 and 30, and the lineal movement of the rod is transformed into rotational movement of the shaft 66 about its axis by the cooperative action of the blocks 60, 60 and the channels 64, 64 of the lever arms 62, 62. As the piston rod moves lineally, it carries with it the blocks 60, 60 which are rotatably pinned to the rod. As the blocks 60, 60 move lineally they also slide longitudinally within the channels 64, 64 causing the arms 62, 62 to rotate about the axis of the vertical shaft 66. The radial distance between the shaft 66 and the blocks 60, 60 decreases from a maximum at the "full-closed" position as in FIG. 4 to a minimum at the mid point of the stroke of the pistons to a maximum once again at the "full-open" position as in FIG. 3. Thus, it can be seen that for each stroke of the pistons 28 and 30, the blocks 60, 60 slidingly reciprocate within the channels 64, 64 from positions of maximum to minimum to maximum radial distance from the axis of the shaft 66. It can also be seen that, as the blocks 60, 60 are nonrotatably retained within the channels 64, 64, for each stroke of the pistons 28 and 30 they rotate about the wrist pin 58 the same extent as the arms 62, 62 about the axis of the shaft 66. For the purpose of illustration, I have shown the extent of rotation to be 90°. However, it is to be understood that this is variable and may be changed by increasing or decreasing the stroke of the pistons or by relocating the pin 58 on the rod 32.

As the lever arms 62, 62 are thus rotated about the longitudinal axis of the shaft 66, the shaft 66, keyed to the lever arms is thus caused to similarly rotate about its longitudinal axis. As the valve shaft rotates, the valve V to which it has been connected likewise rotates, and in the case of a 90° valve, would be rotated from a "full-open" position to a "full-closed" position.

By offsetting the pin from the midpoint of the piston rod, more precise control of the movement of the valve can be obtained since it then takes more piston movement towards the end of its stroke to effect movement of the valve. It is apparent that such arrangement is used to best advantage for a metering valve and not an "on-off" valve.

Automatic systems to which the present invention is ideally adaptable are generally monitored at a central control panel equipped with various signaling devices to indicate the proper functioning or malfunctioning of the numerous devices within the system. The novel valve actuator of the present invention is therefore provided with switch means to indicate by signaling means at a remote location, such as a central control panel, the "full-open" or "full-closed" position of the connected valve V actuated thereby, as described.

A switch assembly 12 is removably secured to the actuator housing 14, and it includes an additional housing 76 which extends outwardly from the actuator housing opening 20 which is transversely of the cylinder bores. For purposes of illustration I have shown the switch assembly housing secured to the actuator assembly housing by means of bolts 72, 72 connecting the flange 18 on the housing 14 to a flange 74 formed on the housing 76 of the switch assembly.

Figure 6:
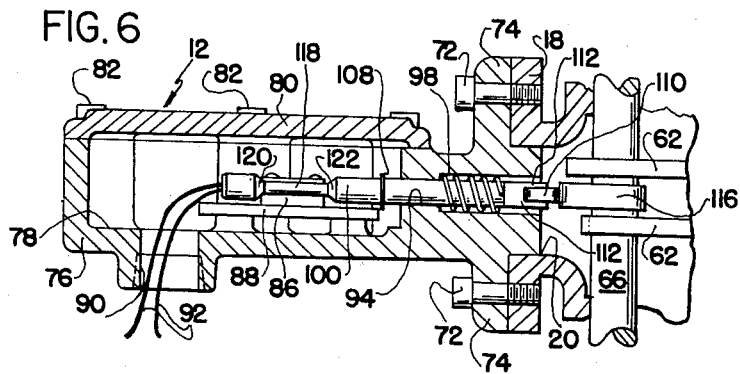
FIG. 6 is a fragmentary vertical sectional view taken substantially on line 6—6 of FIG. 5 with certain parts thereof shown in full.

The switch assembly housing has a cavity 78 which is closed by a cover 80 removably secured to the housing by a plurality of screws 82, 82 as best seen in FIG. 6. Spaced micro switches 86 and 87 or the like are mounted on plates 88, 88 which are adjustably secured to the housing within its cavity. A suitable opening 90 is provided in the housing to receive conductors 92, 92 which are connected to the switches in circuit with remotely located electrical devices such as signaling means.

A bore 94 is formed in the housing 76 between its cavity 78 and the opening 20 in the actuator housing, and this bore has a shoulder 98. A switch actuating pin 100 extends through the bore 94 for reciprocal sliding movement therein with its inner terminal portion disposed between the micro switches 86 and 87 as shown in FIG. 5. The outer terminal portion of the actuating pin projects outwardly of the bore 94 and into the opening 20 in the housing 14. A coil spring 102 surrounding the pin 100 is retained within the bore 94 between the internal shoulder 98 and a shoulder 104 formed on the bifurcated outer end portion 106 of the pin 100 biasing the said pin outwardly. The actuating pin is retained within the bore 94 against the bias of the coil spring by a snap ring 108 which embraces the pin within the switch housing cavity. A roller 110 is rotatably supported between the furcations 112, 112 on the switch actuating pin and is adapted to engage a cam 116 keyed to the valve shaft 66 between the lever arms 62, 62 as shown in FIG. 6.

That part of the pin 100 which is within the cavity 78 is provided with a reduced diameter portion 118 and has beveled surfaces 120 and 122 for engagement with the guides 124 and 126 respectively on the arms 128 and 130 of the micro switches.

As the valve shaft 66 is rotated about its longitudinal axis by the movement of the lever arms 62, 62 an eccentric cam 116 keyed thereon between the arms 62, 62, for rotational movement with the shaft is likewise rotated through an arc of 90°. The roller 110 is biased by the coil spring 102 into engagement with the cam 116 as shown in FIGS. 5 and 6 of the drawing. Therefore, as the cam 116 rotates with the valve shaft 66, the actuating pin 100 is made to slide axially within the bore 94 by the action of the cam 116 against the roller 110, overcoming the bias of the coil spring 102. FIGS. 5 and 6 of the drawing show the position of the actuating pin 100 within the switch assembly 12 when the valve shaft 66 has been rotated to a "full-open" position of the associated valve V. It can be seen that the cam 116 has urged the actuating pin 100 to slide axially within the bore 94 whereby the reduced portion 118 of the pin 100 located inwardly from the free end thereof as shown, is moved further into the cavity 78. As the actuating pin is moved into the cavity, the guide 124 on the arm of the micro switch 86 engages the beveled surface 122, depressing the arm and completing an electric circuit to energize a signal device on a remote control panel to indicate the "full-open" position of the valve V.

When it is desired to close the valve, compressed air or fluid is introduced into the cylinder 24 and exhausted from the cylinder 26 causing the pistons 28 and 30 to move to the position shown in FIG. 4. As the pistons move, the valve shaft 66 rotates in an opposite direction by the aforesaid cooperative action of the blocks 60, 60 and the lever arms 62, 62 keyed to the shaft, thereby closing the valve V. As the shaft 66 is rotated to the "full-closed" position shown in FIG. 4, the cam 116 is similarly rotated. The biasing force of the coil spring 102 urges the pin 100 to move axially within the bore 94 outwardly of the cavity 78 whereby the guide 124 on the arm of the micro switch 86 moves laterally outwardly therefrom and into engagement with the reduced portion 118 thereby breaking the circuit to de-energize the device signaling "full-open." As the guide 126 on the arm of the micro switch 87 is engaged by the beveled surface 120, it is depressed to complete a circuit to energize a signal device to indicate the "full-closed" position of the valve V.

It is to be understood that while I have described remote indication of the "full-open" and "full-closed" positions of the associated valve V, remote indication of an intermediate position thereof may be readily effected by the present invention.

While I have also described the energizing and de-energizing of remote signaling devices to indicate the "full-open" and "full-closed" positions of the operatively connected associated valve V, it is to be further understood that other devices such as pumps, timers, or the like may also be controlled in a similar manner by my novel valve actuator.

The invention claimed is:

1. An actuator for a valve of the type which is opened and closed by rotative movement, the said actuator comprising a housing supporting a cylinder, a piston reciprocable in the cylinder and having an extending rod, a shaft rotatably supported in the housing for engagement with such a valve to operate the same, a radially extending, elongated lever arm supported by and rotatable with said shaft, said lever arm being provided with a longitudinally extending channel therein, a member carried by said rod and engageable by said arm for longitudinal sliding movement within the channel responsive to piston movement to rotate the shaft whereby to open and close the valve, a switch assembly connected to the actuator housing and including a switch and a switch actuator, said switch actuator comprising a slidably disposed, elongated pin having a longitudinal axis extending transverse to the longitudinal axis of said shaft, and switch engaging means on one end portion of said pin for operating said switch responsive upon axial movement of said pin and cam means connected to said shaft engageable with the opposite end of said elongated pin for operating said switch actuator to open and close the switch in keeping with positions of the valve, the switch being operable to control remotely located means indicating positions of the valve, and means maintaining said pin in engagement with said cam.

2. An actuator for a valve of the type which is opened and closed by rotative movement, the said actuator comprising: a housing supporting a cylinder, a piston reciprocable in the cylinder and having an extending rod, a valve actuating shaft extending transverse to said rod and laterally spaced therefrom, said shaft being rotatably supported in the housing for engagement with such a valve to operate the same, means interconnecting said rod and shaft to rotate the shaft responsive to piston movement whereby to open and close the valve, said means including a radially extending elongated channel member supported by and rotatable with said shaft and a block carried by said piston rod and pivotally connected thereto by a pin for rotation about an axis parallel to said valve actuating shaft, said block having a pair of parallel flat sides engageable within said channel member for longitudinal sliding movement responsive to piston movement.

3. An actuator as in claim 2 further comprising a second channel member cooperating with a second pivoted block, said second channel member and its respective block being disposed on the opposite side of said piston rod from said first-mentioned channel member and its block.

4. An actuator for a valve of the type which is opened and closed by rotative movement, said actuator comprising: a rotatable shaft for engagement with such a valve and means for rotating said shaft back and forth through an arc to open and close the valve, a cam carried by said shaft, an elongated axially slidable switch actuating pin having one end yieldingly held in contact with said cam, said pin having a switch engaging surface near its other end, a switch laterally spaced from said pin and having an arm positioned to be engaged and displaced by said switch engaging surface on said pin; and adjustable mounting means for said switch for locating the same in any of a number of positions along the length of said pin whereby said switch may be actuated at different axial positions of said pin.

5. An actuator as in claim 4 wherein said switch actuating pin has a portion of reduced cross section, said switch actuating surface being defined by the junction of one end of said portion with the remainder of said pin, said actuator further comprising a second switch actuating surface at the junction of the other end of said portion with the remainder of said pin, a second switch laterally spaced from said pin on the other side of said pin from the first-mentioned switch, said second switch having an arm positioned to be engaged and displaced by said second switch engaging surface on said pin; and adjustable mounting means for said second switch for locating the same in any of a number of positions along the length of said pin.

References Cited by the Examiner
UNITED STATES PATENTS

| | | | |
|---|---|---|---|
| 1,671,409 | 5/28 | Cromie | 137—554 |
| 1,989,860 | 2/35 | Herring. | |
| 1,989,942 | 2/35 | Parks et al. | |
| 2,044,025 | 6/36 | Windas | 200—153 X |
| 2,330,388 | 9/43 | Scott-Paine | 137—554 X |
| 2,639,337 | 5/53 | Framhein | 200—153.12 X |
| 2,675,435 | 4/54 | Framhein | 200—153.12 X |
| 2,743,897 | 5/56 | Elliott et al. | 251—60 X |
| 2,974,921 | 3/61 | Kaswan | 251—58 |
| 3,056,573 | 10/62 | Matheson et al. | 251—31 |

M. CARY NELSON, *Primary Examiner.*